United States Patent Office 3,417,034
Patented Dec. 17, 1968

3,417,034
POLYMERIZATION PROCESS FOR MANUFACTURING POLYCYCLIC POLYETHER POLYOLS OF CONTROLLED MOLECULAR WEIGHT
Kenneth L. Hoy, St. Albans, W. Va., assignor to Union Carbide Corporation, a corporation of New York
No Drawing. Filed Jan. 7, 1965, Ser. No. 424,127
27 Claims. (Cl. 260—2)

ABSTRACT OF THE DISCLOSURE

A process for the production of polymeric polycyclic polyether polyols of controlled average molecular weight and functionality which involves the reaction of (a) a polycarbocyclic compound having at least one cyclic vicinal epoxy group and at least one hydroxyl equivalent, with (b) an alcoholic hydroxyl-containing compound or water, and an acidic catalyst, under carefully defined conditions of (a) and (b) above.

---

This invention is directed to the production of polyether polyols from epoxy monomers. In an initial aspect this invention provides a novel process for producing polymeric polyols of controlled molecular weight and functionality. In a more particular aspect this invention provides a novel process for production of polycyclic polyether polyols which demonstrate excellent properties as coatings.

The polymerization of epoxy monomers is well known in the modern resin art. Such epoxy polymerizations commonly carried out in the presence of Lewis acid or like catalysts also produce notoriously rapid exotherms. Accordingly, even in the case of polymerizing monoepoxy monomers, it remained difficult to control degree of polymerization since only temperature, and the relative concentrations of monomer and catalyst remained in control of the operator. These factors are at best indirect controls of the polymerization reaction, and do not offer means of predictably controlling an epoxy polymerization without reliance upon a history of experimentation to establish the response of a given epoxy monomer to changes of these variables. Accordingly the making of a reproducible liquid to fusible epoxy polymer of predetermined molecular weight under plant conditions is, due to the rate of the epoxy polymerization, a difficult and expensive task.

According to the instant invention, there is provided a novel process by which molecular weight of polymers derived from a broad spectrum monoepoxy and diepoxy monomers may be effectively controlled to coincide with predetermined objectives. The novel process of this invention also enables control of polyepoxy polymerizations to produce liquid to fusible polyfunctional polymers rather than infusible crosslinked products. In particular this invention enables the production of polycyclic polyether polyols of controlled functionality and molecular weight.

The novel process of this invention comprises the polymerization of a polycyclic epoxy alcohol or a polyepoxide or a polyepoxy alcohol in the continual presence of free strong acid catalyst, e.g., boron trifluoride, and also in the presence of a non-epoxy hydroxyl containing chain length modifier. Therefore, the novel process is accomplished by constantly adding catalyst to a solution of the monomer and chain modifier in a medium which will dissolve or suspend the polymer produced.

It is apparent that control of the length of the polymer will be dependent upon the relative amounts of monomer and chain length modifier in the polymerization process. The approximate ratio between these two components of the polymerization reaction may be calculated by the following formula $$\frac{\text{Moles of Epoxy Monomer}}{\text{Moles of Chain Modifier}} = \frac{n+1}{(E-1)n} + E$$

wherein $n+1$ represents the number of repeating units desired in the ultimate polymer product, and wherein $E$ represents the number of epoxy groups in each monomer molecule. Thus, for example, to produce a polymer having a chain length averaging 15 monomer units there could be added about 15 moles of a monoepoxy alcohol or polyol to about 1 mole of water, whereas to produce a polymer of similar chain length from a diepoxide it would be necessary to add 16 moles of water per mole of monomer. Generally, it is preferred to add a slight excess of chain modifier, up to about a 25 percent excess by weight. Particularly when polymerizing monoepoxy alcohols or polyols, the mass ratio between the amount of monomer and the amount of chain length modifier is fairly large and thus as excess of 25 percent or more by weight of chain length modifier is at times desirable in order to obtain the desired chain modifying effect. For example, if it is desired to polymerize 5-oxatetracyclo[6.2.1.0$^{2,7}$.0$^{4,6}$]undecan-9(10)-ol to a chain length of 15 employing water as a chain length modifier, the above formula would dictate a molar ratio of 15:1 which corresponds to a mass ratio of the reactants of about 120:1. Thus, in such an instance it readily can be appreciated that the mass polymerization dynamics of the system might well require a 25 percent excess of water (i.e., 1.25 moles) to obtain chain length as desired. In such instances, although excess water is employed, analysis of the final reaction mixture usually reveals no more than trace amounts of the water, the loss being possibly ascribed to evaporation loss, or perhaps a small amount of hydrogen bonding with the polyether polyol or the like. On the other hand when a diepoxide is to be polymerized, the amount of water called for in the above formula will be appreciable, even on a mass basis when compared with the monomer. For example to polymerize 5,10-dioxapentacyclo[6.3.1.0$^{2,7}$.0$^{4,6}$.0$^{9,11}$]dodecane to a chain length of 15, the molar ratio of monomer to chain length modifier would be 15:16, and even using water as a chain length modifier the mass ratio would be less than 9:1. In such a case when the water constitutes a significant portion even on a mass basis, the amount of excess water, if required at all, need be very slight, of the order of 1 percent based on the theoretical water required. Overall the total excess of chain length modifier required is less than about 1 percent based on the total weight of monomer and chain length modifier.

The polymerization process of this invention is employed to polymerize hydroxy containing monoepoxides, polyepoxides, and hydroxyl containing polyepoxides to produce novel controlled molecular weight polyether polyols. The preferred monomers employed in the instant polymerization process contain at least one epoxy group and at least one additional hydroxy equivalent in the form of hydroxyl groups or cyclic vicinal epoxy groups (the said cyclic vicinal epoxy group each accounting for two hydroxyl equivalents since by hydration such a vicinal epoxy group will yield two hydroxyl groups). By the term "cyclic vicinal epoxy group" is meant a vicinal epoxy group whose vicinal carbon atoms form part of a carbocyclic ring structure. The monomers useful in the novel polymerization process of the instant invention are accordingly characterized by (1) a polycarbocyclic ring structure, preferably saturated, comprising at least one integral bicyclo[2.2.1]heptanoid ring structure alone or as part of a fused polycarbocyclic ring system having up to 6 carbocycles, preferably up to 4 carbocycles, each carbocycle preferably containing from 5 to 6 carbon atoms, and (2) at least one cyclic vicinal epoxy group and at least one additional hydroxyl equivalent in the form of hydroxyl groups or cyclic vicinal epoxy groups, said hydroxyl groups being bonded to the polycarbocyclic ring directly or through a bivalent organic radical. Accordingly, the polycyclic hydroxy compounds of this invention will minimally contain at least one vicinal epoxy group together with one hydroxyl group. The monomer useful in the process of this invention may preferably contain up to about eight total hydroxyl equivalents including the single vicinal epoxy group always present in the monomers. As hereinbefore set forth, the hydroxyl groups, if present, are bonded to the polycyclic ring directly or through a bivalent organic radical preferably an alkylene, alkyleneoxy, or poly-(alkyleneoxy) group. These bivalent radicals can obtain a plurality of hydroxyl groups, preferably up to six. The bivalent alkylene moieties preferably contain from 1 to about 6 carbon atoms. In the particular case of the polyalkyleneoxy radicals, those preferably are identified by repeating alkyleneoxy units containing from two to four carbon atoms such as, for example, ethylene, 1,2-propylene, 1,3-propylene, 1,2-butylene, 2,3-butylene, 1,3-butylene, and 1,4-butylene and the like. The hydroxypolyalkyleneoxy substituents are preferably relatively short chain groups, i.e., containing up to about 5 repeating alkyleneoxy units.

Accordingly, the monomers useful in the compositions of this invention may be considered to be of the classes of monoepoxy polycyclic alcohols, monoepoxy polycyclic polyols, diepoxy polycyclic compounds, diepoxy polycyclic alcohols, and diepoxy polycyclic polyols all of which compounds contain at least one vicinal epoxy group and one additional hydroxyl equivalent as explained above. Preferred monomers contain 1 to 2 cyclic vicinal epoxy groups. The monoepoxy alcohols and polyols are highly preferred.

These polycyclic epoxy containing monomers when polymerized according to the process of this invention invention produce polycyclic polyether polyols of controllable functionality and chain length. The resulting polymers by virtue of their prominent repeating polycarbocyclic ring units and by virtue of their high carbon to oxygen ratio can be formulated into hard, yet flexible, chemical resistant, non-discoloring coatings.

The preferred epoxy monomers useful in the process of this invention contain from 2 to 4 carbocycles, having 5 to 6 carbon atoms in each carbocycle, and are identified by a bicyclo[2.2.1]heptanoid ring alone or as part of a fused polycarbocyclic structure, such as for example, the following ring structures:

and the like. Highly preferred are those compounds having ring structures containing from 3 to 4 carbocycles.

It is pointed out that the vicinal epoxy substitution and the hydroxyl substitution of polycyclic monomers useful in the process of this invention takes place at non-bridgehead positions. Thus, for example, the 1 and 4 positions of a bicyclo[2.2.1]heptanoid ring, would not be those substituted by either hydroxyl or vicinal epoxy groups, likewise, in a tricyclo[5.2.1.0$^{2,6}$]decanoid ring, the 1, 2, 6, and 7 positions, being bridgehead positions would not carry the hydroxyl or vicinal epoxy substitutions. It is understood that these fused polycyclic epoxy monomers can also be further substituted, preferably with alkyl groups, highly preferably, of 1 to 6 carbon atoms. Of course such alkyl substitution would also be preferably effected at other than bridgehead positions on the polycarbocyclic ring. In addition, in a particular preferred embodiment the above polycyclic epoxy monomers useful in this invention are preferably not substituted on the methano carbon atom with other than hydrogen substitution.

Specific compounds which may be used in the instant invention as the said polycyclic epoxy monomers include the following. For example specific compounds having the characteristic dicyclo[2.2.1]heptanoid ring are:

3-oxatricyclo[3.2.1]octan-6-ol,
6-ethyl-3-oxatricyclo[3.2.1]octan-7-ol,
7-oxapropyl-3-oxatricyclo[3.2.1]octan-8-ol,
3-oxatricyclo[3.2.1]octane-6,7-diol,
3-oxatricyclo[3.2.1]octane-6,8-diol, epoxybicyclo[2.2.1]heptyl alkanols such as 3-oxatricyclo[3.2.1]octyl-6-butanol,
3-oxatricyclo[3.2.1]octyl-6-methanol,
6-hydroxymethyl-3-oxatricyclo[3.2.1]octan-5-ol.

The oxypolyalkyleneoxyalkanols and oxyalkanols having the bicyclo[2.2.1]heptyl structure such as:

3-oxatricyclo[3.2.1]oct-6-oxyethanol,
5-isopropyl-3-oxatricyclo[3.2.1]oct-6-oxytriethyleneoxyethanol and the like.

Specific examples of suitable compounds having characteristic tricyclic structures such as the tricyclo[5.2.1.0$^{2,6}$] decanoid and the tricyclo[6.2.1.0$^{2,7}$undecanoid ring are the following:

5-oxatetracyclo[6.2.1.0$^{2,7}$.0$^{3,5}$]undecan-9-ol,
11-methyl-5-oxatetracyclo[7.2.1.0$^{2,8}$.0$^{4,6}$]dodecan-10-ol,
5-oxatetracyclo[6.2.1.0$^{2,7}$.0$^{4,6}$]undecane-9,10-diol, bicyclo[2.2.1]heptanoid 

tricyclo[5.2.1.0$^{2,6}$]decanoid 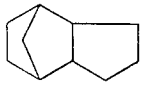

tricyclo[6.2.1.0$^{2,7}$]undecanoid 

tetracyclo[6.2.1.1$^{3,6}$.0$^{2,7}$]dodecanoid 

tetracyclo[6.5.1.0$^{2,7}$.0$^{9,13}$]tetradecanoid 

tetracyclo[6.6.1.0$^{2,7}$.0$^{9,14}$]pentadecanoid 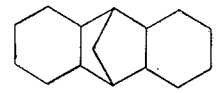

5-oxatetracyclo[6.2.1.0²,⁷.0⁴,⁶]undecan-10-ol,
5-oxatetracyclo[7.2.1.0²,⁸.0⁴,⁶]dodec-9-oxyethanol,
5-oxatetracyclo[6.2.1.0²,⁷.0⁴,⁶]undec-9-oxy-n-pentanol,
5-oxatetracyclo[7.2.1.0²,⁸.0⁴,⁶]dodec-9-oxy-n-butanol,
5-oxatetracyclo[6.2.1.0²,⁷.0⁴,⁶]undec-9-oxy-n-butanol,
5-oxatetracyclo[7.2.1.0²,⁷.0⁴,⁶]undec-9-oxy-t-butanol,
5-oxatetracyclo[6,2,1.0²,⁷.0⁴,⁶]undec-9-oxy-n-hexanol,
5-oxatetracyclo[6.2.1.0²,⁷.0⁴,⁶]undec-9-oxy-n-octanol,
5-oxatetracyclo[7.2.1.0²,⁸.0⁴,⁶]dodec-9-oxy-n-decanol, and the like.

Illustrative examples of the 5-oxatetracyclo[6.2.1.0²,⁷.0⁴,⁶]undec-9-oxyalkane-polyols and 5-oxatetracyclo[7.2.1.0²,⁸.0³,⁵]undec-9-oxyalkane polyols which are contemplated include for instance, the oxyalkanediols, e.g., 5-oxatetracyclo[6.2.1.0²,⁷.0⁴,⁶]undec-9-oxypropanediols,
5-oxatetracyclo[7.2.1.0²,⁸.0⁴,⁶]dodec-10-oxybutanediols,
5-oxatetracyclo[6.2.1.0²,⁷.0⁴,⁶]undec-9-oxypentanediols,
5-oxatetracyclo[7.2.1.0²,⁸.0⁴,⁶]dodec-10-oxyhexanediols, and the like;

the oxyalkanetriols, e.g., 5-oxatetracyclo[6.2.1.0²,⁷.0⁴,⁶]undec-9-oxybutanetriols,
5-oxatetracyclo[7.2.1.0²,⁸.0⁴,⁶]dodec-11-oxypentanetriols,
5-oxatetracyclo[6.2.1.0²,⁷.0⁴,⁶]undec-9-oxyhexanetriols,
5-oxatetracyclo[7.2.1.0²,⁸.0⁴,⁶]dodec-10-oxyoctanetriols, and the like.

The oxyalkanetetrols, e.g., the 5-oxatetracyclo[6.2.1.0²,⁷.0⁴,⁶]undec-9-oxyhexanetetrols, and the like; the 5-oxatetracyclo[6.2.1.0²,⁷.0⁴,⁶]undec-9-oxyalkanepentols, and the like.

It is understood that the useful polycyclic epoxy monomers also include alkyl substituted derivatives of the above compounds particularly wherein the alkyl substitution is effected at non-bridgehead positions. Among the tricyclic compounds, those having the characteristic tricyclo[5.2.1.0²,⁶]decanoid ring structure is preferred.

Specific examples of suitable monomers having characteristic tetracyclic structures such as the tetracyclo[6.2.1.1³,⁶.0²,⁷]dodecyl, tetracyclo[6.5.1.0²,⁷.0⁹,¹³]tetradecanoid, or tetracyclo[6.6.1.0²,⁷.0⁹,¹⁴]pentadecanoid or the like are for example:

10-oxapentacyclo[6.3.1.1³,⁶.0²,⁷.0⁹,¹¹]tridecan-4-ol,
4-ethyl-10-oxapentacyclo[6.3.1.1³,⁶.0²,⁷.0⁹,¹¹]tridecan-5-ol,
4-ethyl-10-oxapentacyclo[6.3.1.1³,⁶.0²,⁷.0⁹,¹¹]tridecane-4,5-diol,
5-oxapentacyclo[7.6.1.0²,⁸.0⁴,⁶.0¹⁰,¹⁵]hexadecan-12-ol,
5-oxapentacyclo[6.6.1.0²,⁷.0⁴,⁶.0⁹,¹⁴]pentadecan-11-ol,
5-oxapentacyclo[6.6.1.0²,⁷.0⁴,⁶.0⁹,¹⁴]pentadecane-11,12-diol,
5-methyl-10-oxapentacyclo[6.3.1.1³,⁶.0²,⁷.0⁹,¹¹]tridec-4-ylmethanol,
10-oxapentacyclo[6.3.1.1³,⁶.0²,⁷.0⁹,¹¹]tridec-4-ylmethanol,
5-oxapentacyclo[6.6.1.0²,⁷.0⁴,⁶.0⁹,¹⁴]pentadec-11-ylethanol,
10-oxapentacyclo[6.3.1.1³,⁶.0²,⁷.0⁹,¹¹]tridec-4-yl-n-propanol,
5-oxapentacyclo[7.6.1.0²,⁸.0⁴,⁶.0⁹,¹⁴]hexadec-12-ylisopropanol,
10-oxapentacyclo[6.3.1.1³,⁶.0²,⁷.0⁹,¹¹]tridec-4-yl-n-butanol,
10-oxapentacyclo[6.3.1.1³,⁶.0²,⁷.0⁹,¹¹]tridec-4-ylisobutanol,
5-oxapentacyclo[6.6.1.0²,⁷.0⁴,⁶.0⁹,¹⁴]pentadec-11-yl-n-octan-2-ol,
10-oxapentacyclo[6.3.1.1³,⁶.0²,⁷.0⁹,¹¹]tridec-4-yl-n-decanol, and the like.

Among the oxyalkanols having basic tetracarbocyclic structures which are encompassed within the scope of the invention are, for example, 10-oxapentacyclo[6.3.1.1³,⁶.0²,⁷.0⁹,¹¹]tridec-4-oxy-n-pentanol,
5-oxapentacyclo[6.6.1.0²,⁷.0⁴,⁶.0⁹,¹⁴]pentadec-11-oxyethanol,
5-oxapentacyclo[7.6.1.0²,⁸.0⁴,⁶.0¹⁰,¹⁵]hexadec-12-oxy-n-propanol,
10-oxapentacyclo[6.3.1.1³,⁶.0²,⁷.0⁹,¹¹]tridec-4-oxyisopropanol,
10-oxapentacyclo[6.3.1.1³,⁶.0²,⁷.0⁹,¹¹]tridec-4-oxy-n-butanol,
5-oxapentacyclo[6.6.1.0²,⁷.0⁴,⁶.0⁹,¹⁴]pentadec-11-oxyisobutanol,
5-oxapentacyclo[7.6.1.0²,⁸.0⁴,⁶.0¹⁰,¹⁵]hexadec-12-oxy-t-butanol,
10-oxapentacyclo[6.3.1.1³,⁶.0²,⁷.0⁹,¹¹]tridec-4-oxy-n-hexanol,
5-oxapentacyclo[6.6.1.0²,⁷.0⁴,⁶.0⁹,¹⁴]pentadec-11-oxy-n-octan-4-ol,
5-oxapentacyclo[7.6.1.0²,⁸.0⁴⁶.0¹⁰¹⁵]hexadec-12-oxy-n-dodecanol, and the like.

Illustrative oxyalkane-poly-ols based on tetracarbocyclic structures are, for instance, the oxyalkane diols, e.g., 10-oxapentacyclo[6.3.1.1³⁶.0²,⁷.0⁹,¹¹]tridec-4-oxypropanediols,
5-oxapentacyclo[6.6.1.0²,⁷.0⁴,⁶.0⁹,¹⁴]pentadec-11-oxybutanediols,
10-oxapentacyclo[6.3.1.1³,⁶.0²,⁷.0⁹,¹¹]tridec-4-oxypentanediols,
5-oxapentacyclo[7.6.1.0²,⁸.0⁴,⁶.0¹⁰,¹⁵]hexadec-12-oxyhexanediols, and the like; the oxyalkanetriols, e.g.,
10-oxapentacyclo[6.3.1.1³,⁶.0²,⁷.0⁹,¹¹]tridec-4-oxybutanetriols,
5-oxapentacyclo[6.6.1.0²,⁷.0⁴,⁶.0⁹,¹⁴]pentadec-11-oxypentanetriols,
10-oxapentacyclo[6.3.1.1³,⁶.0²,⁷.0⁹,¹¹]tridec-4-oxyoctanetriols,
10-oxapentacyclo[6.3.1.1³,⁶.0²,⁷.0⁹,¹¹]tridec-4-oxynonanetriols, and the like; the oxyalkanetetrols, e.g.,
10-oxapentacyclo[6.3.1.1³,⁶.0²,⁷.0⁹,¹¹]tridec-4-oxyhexanetetrols, and the like;
10-oxapentacyclo[6.3.1.1³,⁶.0²,⁷.0⁹,¹¹]tridec-4-oxyalkanepentols, and the like.

Typical methyleneoxyalkanols having these tetracarbocyclic structures include, among others, 10-oxapentacyclo[6.3.1.1³,⁶.0²,⁷.0⁹,¹¹]tridec-4-ylmethyleneoxy-n-pentanol,
5-oxapentacyclo[6.6.1.0²,⁷.0⁴,⁶.0⁹,¹⁴]pentadec-11-ylmethyleneoxyethanol,
10-oxapentacyclo[7.6.1.0²,⁸.0⁴,⁶.0¹⁰,¹⁵]hexadec-12-ylmethyleneoxy-n-propanol,
10-oxapentacyclo[6.3.1.1³,⁶.0²,⁷.0⁹,¹¹]tridec-4-ylmethyleneoxyisopropanol,
10-oxapentacyclo[6.3..1.1³,⁶.0²,⁷.0⁹,¹¹]tridec-4-ylmethyleneoxy-n-butanol,
10-oxapentacyclo[6.3.1.1³,⁶.0²,⁷.0⁹,¹¹]tridec-4-ylmethyleneoxy-n-hexanol,
10-oxapentacyclo[6.3.1.1³,⁶.0²,⁷.0⁹,¹¹]tridec-4-ylmethyleneoxy-n-dodecanol, and the like.

Illustrative methyleneoxyalkane-poly-ols which are contemplated include, for instance, the 10-oxapentacyclo[6.3.1.1³,⁶.0²,⁷.0⁹,¹¹]tridec-4-ylmethylleneoxyalkanodiols, e.g., 10-oxapentacyclo[6.3.1.1³,⁶.0²,⁷.0⁹,¹¹]tridec-4-ylmethyleneoxypropanediols,
5-oxapentacyclo[6.6.1.0²,⁷.0⁴,⁶.0⁹,¹⁴]pentadec-11-ylmethyleneoxybutanediols,
10-oxapentacyclo[7.6.1.0²,⁸.0⁴,⁶.0¹⁰,¹⁵]tridec-12-methyleneoxypentanediols,
10-oxapentacyclo[6.3.1.1³,⁶.0²,⁷.0⁹,¹¹]tridec-4-ylmethyleneoxyhexanediols,
10-oxapentacyclo[6.3.1.1³,⁶.0²,⁷.0⁹,¹¹]tridec-4-ylmethyleneoxyoctanediols, and the like; the methyleneoxyalkanetriols, e.g.,
10-oxapentacyclo[6.3.1.1³,⁶.0²,⁷.0⁹,¹¹]tridec-4-ylmethyleneoxybutanetriols, 5-oxapentacyclo[6.6.1.0$^{2,7}$.0$^{4,6}$.0$^{9,14}$]pentadec-11-ylmethyl-eneoxypentanetriols, 10-oxapentacyclo[6.3.1.1$^{3,6}$.0$^{2,7}$.0$^{9,11}$]tridec-4-ylmethyl-eneoxyoctanetriols, and the like;

the methyleneoxyalkanetetrols, e.g., the 10-oxapentacyclo-[6.3.1.1$^{3,6}$.0$^{2,7}$.0$^{9,11}$]]tridec-4-ylmethyleneoxyhexanetetrols, and the like;

10-oxapentacyclo[6.3.1.1$^{3,6}$.0$^{2,7}$.0$^{9,11}$]tridec-4-ylmethyleneoxyalkanepentols; and the like.

The 10 - oxapentacyclo[6.3.1.1$^{3,6}$.0$^{2,7}$.0$^{9,11}$]tridec - 4,5-ylene-dialkanols are exemplified, preferably, by such compounds as 10-oxapentacyclo[6.3.1.1$^{3,6}$.0$^{2,7}$.0$^{9,11}$]tridec-4,5-ylene-dimethanol,10-oxapentacyclo[6.3.1.1$^{3,6}$.0$^{2,7}$.0$^{9,11}$]tridec-4,5-ylene-diethanol,, and the like.

It is understood that the useful compounds also include alkyl substituted derivatives of the above compounds, particularly wherein the alkyl substitution is effected by nonbridgehead positions. Among the tetracyclic compounds, those having the characteristic tetracyclo-[6.2.1.1$^{3,6}$.0$^{2,7}$]dodecyl ring are preferred.

Further illustrative of useful polycyclic hydroxy compounds having even five and six carbocycles in the basic ring structure are the following:

11-oxahexacyclo[6.6.1.1$^{3,6}$.0$^{2,7}$.0$^{9,14}$.0$^{10,12}$]hexadecan-4-ol,
11-oxahexacyclo[6.6.1.1$^{3,6}$.0$^{2,7}$.0$^{9,14}$.0$^{10,12}$]hexadecyl-4-butanediol,
5-oxahexacyclo[7.6.1.1$^{11,14}$.0$^{2,8}$.0$^{4,6}$.0$^{10,15}$]heptadec-12-oxyethanol,
5-oxahexacyclo[7.6.1.1$^{11,14}$.0$^{2,8}$.0$^{4,6}$.0$^{10,15}$]heptadec-12-oxybutanediol,
pentacyclo[10.2.1.1$^{5,8}$.0$^{2,11}$.0$^{4,9}$]hexadecane-6,7,13-triol,
5-oxaheptacyclo[7.6.1.1$^{3,7}$.1$^{11,14}$.0$^{2,8}$.0$^{10,15}$]octadecan-12-ol,
5-oxaheptacyclo[7.6.1.1$^{3,7}$.1$^{11,14}$.0$^{2,8}$.0$^{4,6}$.0$^{10,15}$]octadec-12-oxyethanol, and the like. It is again pointed out that alkyl substituted derivatives of these compounds are also included particularly when the alkyl substitution is effected at a nonbridgehead position.

Illustrative of the diepoxy polycyclic compounds which are useful in the novel process of the instant invention are preferably those containing tricarbocyclic and tetracarbocyclic ring structures such as:

5,10-dioxapentacyclo[6.3.1.0$^{2,7}$.0$^{4,5}$.0$^{9,11}$]dodecane
5,11-dioxapentacyclo[7.3.1.0$^{2,8}$.0$^{4,6}$.0$^{10,12}$]tridecane
5,11-dioxahexacyclo[7.3.1.1$^{3,7}$.0$^{2,8}$.0$^{4,6}$.0$^{10,12}$]tetradecane
5,12-dioxahexacyclo[7.6.1.0$^{2,8}$.0$^{4}$.0$^{10,15}$.0$^{11,13}$]hexadecane
5,13-dioxahexacyclo[7.7.1.0$^{2,8}$.0$^{4,6}$.0$^{10,16}$.0$^{12,14}$] heptadecane and the like as well as higher polycyclic diepoxides such as 5,13-dioxaoctacyclo[7.7.1.1$^{3,7}$.1$^{11,15}$.0$^{2,8}$.0$^{4,6}$.0$^{10,16}$.0$^{12,14}$] nonadecane, and the like. A highly preferred monomer is 5,10-dioxapentacyclo[6.3.1.0$^{2,7}$.0$^{4,6}$.0$^{9,11}$].

Other useful monomers include diepoxy alcohols and polyols such as for example, 5,10-dioxapentacyclo[6.3.1.0$^{2,7}$.0$^{4,6}$.0$^{9,11}$]dodec-4-ylmethanol, 5,11-dioxapentacyclo[7.3.1.0$^{2,8}$.0$^{4,6}$.0$^{10,12}$]tridec-4-oxyethanol, and the like. Preferred monomers are the monoepoxy alcohols, monoepoxy polyols, and diepoxy hydrocarbons. Highly preferred are compounds wherein hydroxyl groups are bonded directly to the polycarbocyclic ring structure.

It is understood that alkyl substituted derivatives of these compounds are also contemplated particularly when the alkyl substitution is effected at non-bridgehead positions.

The polymers produced by the novel process are, as hereinbefore stated polycyclic polyether polyols. The polymerization broadly involves contacting the monomer with a hydroxyl containing chain length modifier in the presence of catalyst, the amount of chain modifier to be determined by the chain length desired in the polymer. Accordingly the polymerization scheme may be represented by the following block formulae wherein a polymer of $n+1$ repeating units is produced by contacting a monoepoxy alcohol or polyol and chain modifier in the hereinbefore prescribed molar proportions, in the presence of catalyst:

I

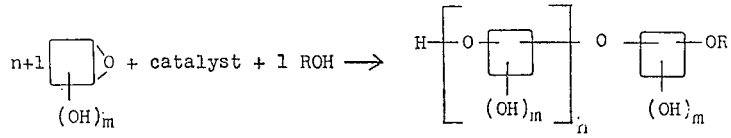

wherein 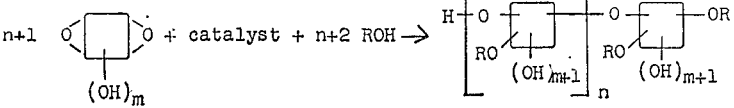

represents the entire remaining portion of the monoepoxy alcohol or polyol molecule excluding the cyclic vicinal epoxy group and the hydroxyl groups, wherein ROH represents the hydroxyl containing chain length modifier hereinafter more explicitly defined (the R portion of the chain length modifier being that which serves to cap the polymer), and wherein $m$ represents the number of hydroxyl groups in the monomer. Similarly to produce a polymer having $n+1$ repeating units from a monomeric diepoxide or a diepoxy alcohol, the polymerization may be represented as follows again with recourse to the prescribed molar proportions of monomer and catalyst hereinbefore set forth:

II

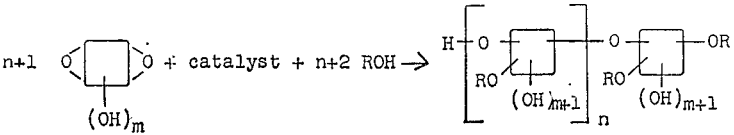

wherein the symbols have similar designations as above. It is pointed out that in the above equations the relative amount of chain length modifier set forth is the theoretical amount. As pointed out hereinbefore, the reaction dynamics of the polymerization system are such that an excess of chain modifier is preferred.

It is pointed out that the novel process of this invention may be employed as above to produce copolymers of two different polycyclic monoepoxy alcohols, monoepoxy polyols, diepoxides or diepoxy alcohols, or diepoxy polyols. Molecular weight can be controlled in the same manner as set forth above.

Thus the novel polymers of this invention are identified, as can be seen from the above structures by at least one hydroxyl group for each repeating unit. Polymers having from about 8 to about 25 repeating units demonstrate a balance of properties which make them extremely useful in the production of coatings and accordingly it is preferred to conduct the novel process of this invention so as to obtain polymers of such average chain length. It is eminently preferred to employ the novel process of this invention to produce controlled molecular weight polymers containing an average of from about 10 to about 16 repeating units, since such polymers demonstrate a functionality of at least one hydroxyl group per repeating unit. Very high molecular weight polymers, of uncontrolled molecular weight, can by virtue of the bulk of polycarbocyclic ring succeed in hindering hydroxyl groups thus decreasing the practical functionality of the polymer.

The polymers produced by the novel process of this invention are believed to consist of various isomeric repeating units resulting from the fact that each monomer has at least 3 possible sites for polymerization. Thus for example a polymer of 5-oxatetracyclo[6.2.1.0$^{2,7}$.0$^{4,6}$]undecan-9(10)-ol could contain repeating units such as the following

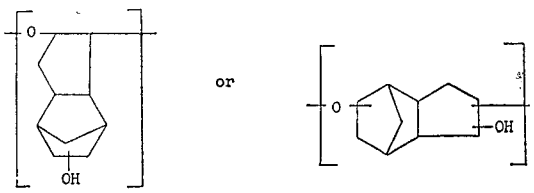

Alternatively, a polymer of 5-oxatetracyclo-[6.2.1.0$^{2,7}$.0$^{4,6}$]undec-9(10)-yl propane-2,3-diol is postulated to have repeating units such as

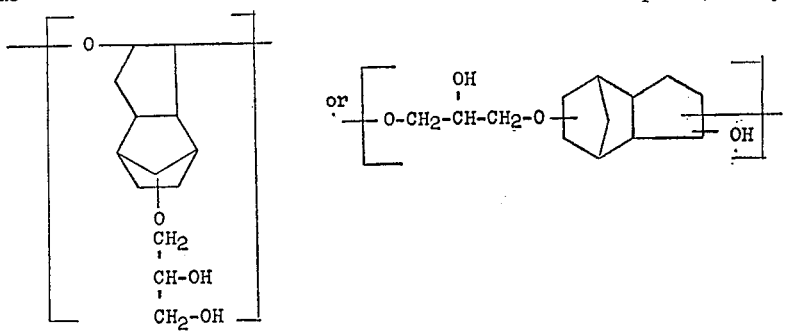

As a final example, the polymerization of a diepoxy monomer, e.g., 5,10 - dioxapentacyclo[6.3.1.0$^{2,7}$.0$^{4,6}$.0$^{9,1}$] dodecane will yield a polymer wherein the average repeating unit contains the "capping" portion of the chain length modifier. The polymer is postulated to have isomeric repeating units such as

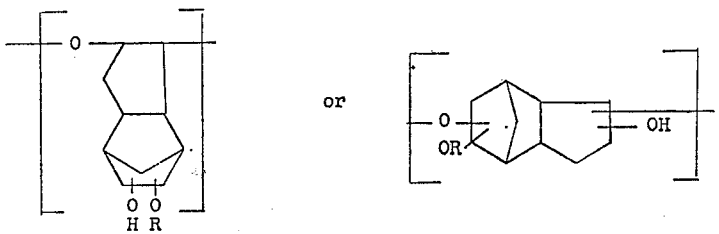

The above structures are probable theoretical polymeric structures which successfully explain the hydroxyl content of the polymers prepared from various polycyclic epoxy monomers.

It is pointed out that in polymerizing diepoxy monomers according to the process of this invention a monohydroxy chain length modifier is employed. Water is highly preferred. The use of difunctional chain length modifiers, e.g., ethylene glycol can result in crosslinking of the monomer thus preventing polymerization to proceed as desired.

The chain length modifiers useful in the novel polymerization process are non-epoxy hydroxyl containing compounds free from phenolic hydroxyl groups (i.e., hydroxyl groups bonded directly to a benzenoid ring) which correspond to the formula

R—OH wherein R represents hydrogen (in which case the chain length modifier is water) or a monovalent organic radical free from substituents other than alcoholic hydroxy groups which react with epoxy groups. The novel chain modifiers used in the novel polymerization process include hydrocarbyl alcohols and polyols further substituted with other groups not reactive with epoxy groups such as halo groups, ether linkages, and the like. Highly preferred as a chain length modifier is water. Other preferred chain length modifiers include aliphatic alcohols, aliphatic polyols, cycloaliphatic alcohols, and cyloaliphatic polyols including such compounds which contain aryl substituents, so long as there are no phenolic hydroxyl groups in the compound. Also suitable as chain length modifiers are the ether alcohols, the ether glycols, and the polyoxyalklyene glycols. Preferred chain length modifiers include the alkanols, alkanepolyols, cycloalkanols, and cycloalkanepolyols.

Typical hydroxy containing organic compounds suitable as chain length modifiers include methanol, ethanol, ethylene glycol, ethylene chlorohydren, ethylene bromohydren, n-propanol, isopropanol, propylene glycol, glycerol, n-butanol, 2-butanol, isobutanol, 1,4-butanediol, 2,2'-dimethyl-1,3-butanediol, pentaerythritol, trimethylolpropane, aryl alcohol, 1,5-pentanediol, n-hexanol, hexylene, glycol, 2-ethylhexanol, 1,2,6-hexanetriol, sorbitol, n-octanol, iso-octanol (mixed isomers) tridecanol, 2,6-dimethylheptanol, diethylene glycol, triethylene glycol, tetraethylene glycol, dipropylene glycol, the poly(oxyethylene) glycols and poly(oxypropylene) glycols, alkylene glycol, monoalkyl ethers such as 1-methoxy-2-ethanol, 1-ethoxy-2-ethanol, 1-isopropoxy-2-ethanol, including the ethers of polyalkylene glycols, such as the monobutyl ether of triethylene glycol; cycloalkanols such as cyclohexanol, 4-methylcyclohexanol, cylohexylmethanol, cyclopentanol, cyclopentane-1,3-diol, including compounds having polycarbocyclic structures similar to those of the monomers hereinbefore described such as bicyclo[2.2.1]heptan-2,6-diol, 3,4-dihydroxytricyclo[2.2.1]heptyl-6-methanol, tricyclo[5.2.1.0$^{2,6}$]decane - 4,5,9 - triol, 4,5 - dihydroxytricyclo [6.2.1.0$^{2,7}$]undec-10-oxyethanol, and the like, aryl substituted alcohols such as benzyl alcohol, phenyl methyl carbinol, and other alcohols such as propionyl alcohol, tetrahydropyran methanol, and the like.

As pointed out above, alcohols and polyols having the same or similar polycarbocyclic structures as are employed in the monomers hereinbefore set forth may also be employed. Thus for example tricyclo[5.2.1.0$^{2,6}$]decane-4,5,9-triol may be employed as a chain length modifier as, for example, the polymerization of 5-oxatetracyclo [6.2.1.0$^{2,7}$.0$^{4,6}$]undecane-10-ol. It may be readily seen by reference to the polymerization reactions hereinbefore illustrated (Reactions I and II) that the use of a chain length modifier (i.e., ROH) which has a structure the same as the monomer being polymerized will result in a polymer having one additional monomer unit by virtue of the "capping" of the polymer by the chain modifier. Thus, for example, when such a chain modifier is employed to cap the polymer a polymer chain of length $n+2$, rather $n+1$ is obtained.

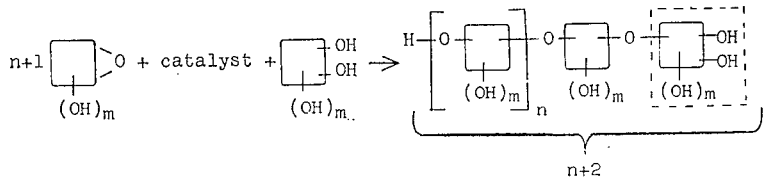

Accordingly the outlined substituent which corresponds to the R substituent in Reaction I above, will "lengthen" the polymer chain if the appropriate polycyclic alcohol chain length modifier is employed.

On the other hand if water is used as a chain length modifier the polymer is "capped" by a hydrogen atom (corresponding to R in Reaction I above) to form a homopolymer having $n+1$ repeating units.

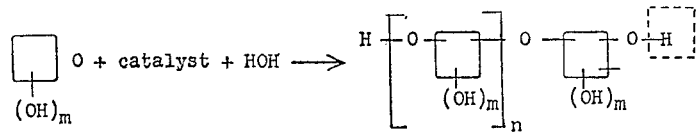

wherein again the outlined hydrogen substituent corresponds to R in the product of Reaction I above. Likewise, for other chain length modifiers, the capping of the polymer is effected in a similar manner.

The use of polyhydroxy chain length modifiers, such as for example ethylene glycol or 1,2,6-hexanetriol will increase the hydroxyl functionality of the polymer and hence may be desirable. However such straight chain aliphatic substituents or poly(oxyalkylene) substituents tend to decrease the hardness and rigidity of the polycarbocyclic polymeric structure. Thus it is apparent that by appropriate choice of the chain modifier a variance in functionality and in properties of the polymer may be effected.

The catalysts useful in the novel process of this invention are acidic catalysts selected from the group consisting of inorganic acids and Lewis acid catalysts. Suitable catalysts include phosphoric acid, sulfuric acid, sulfonic acid and the strong acid ion exchange resins and the like. Other catalysts include boron trifluoride and boron trifluoride complexes of the type which contain no active hydrogen in the complex such as the boron trifluoride etherates; and the Lewis acid salts such as stannic chloride, aluminum chloride, zinc chloride, antimony pentachloride, and the like. Preferred are boron trifluoride and the boron trifluoride etherates; boron trifluoride itself is eminently preferred.

Catalyst is employed in small catalytically effective amounts generally from about 0.2 to about 5 percent by weight based upon the weight of the monomer employed. The catalyst addition should be carried out in such a manner as to insure the presence of free catalyst in the polymerization mixture until the monomer is almost completely converted to polymer, i.e., until testing of the reaction mixture reveals virtual absence of monomer. Since the acid catalysts used in the polymerization tend to form complexes with the polymer as it is formed, catalyst is preferably continuously added to the polymerization mixture until the monomer is substantially converted. Preferably catalyst addition should be maintained until at least 75 percent of the monomer has been converted. Accordingly, it is expeditious to add the catalyst as a solution in the medium in which the polymerization is conducted since by this means regulation of catalyst addition becomes facilitated. Overly rapid addition of catalyst will also produce an exotherm, which if uncontrolled can effect the polymerization reaction and result in a polymer of inferior quality.

The novel polymerization reaction may be carried out over a broad range of temperatures. Generally due to the exothermic reaction which accompanies the catalytic action of the polymerization it is preferred to maintain the polymerization mixture at moderate temperatures during the catalyst addition. Following the catalyst addition the temperature may be raised, however excessive temperatures, although not destructive to the reaction can often result in a discoloration of the polymer product and hence should be avoided. Temperatures which can result in boiling of the chain length modifier, of course should be avoided. Temperatures in the range of about 10° C. to about 70° C. are suitable during catalyst addition. Preferably the temperature is maintained at from about 25° C. to about 50° C. during this stage of the reaction. At the lower temperatures, the polymerization rate becomes slow. Following catalyst addition the temperature may be raised suitably to up to 100° C. Completion of the polymerization may be ascertained by periodic sampling of the polymerization mixture.

Pressure is wholly non-critical to the process, and the polymerization may be conducted under subatmospheric, superatmospheric or atmospheric conditions. Again, if operation at subatmospheric conditions is desired, care should be taken to insure that substantial vaporization of the chain length modifier is not permitted to occur under the prevailing reaction conditions.

The novel polymerization reaction may be effected employing either solution or suspension polymerization techniques. Solution polymerization is effected by conducting the reaction in the presence of an organic medium which is a solvent for the monomer, the chain length modifier, the polymer desired, and catalyst. Of course in the case of ion exchange resin catalyst, the resin will not dissolve. Basic solvents such as pyridine, dimethyl formamide, dimethyl sulfoxide and nitrile solvents appear to tend to inhibit the reaction, perhaps by tending to neutralize the acidic polymerization catalysts. Consequently, non-basic or neutral solvents are preferred. Highly preferred as a solvent is dioxane.

Monomer concentration in the polymerization medium, although not critical at all to the operability of the reaction, is a consideration in attempting to obtain optimum conversion. For example in the polymerization of 5-oxatetracyclo-[6.2.1.0$^{2,7}$.0$^{4,6}$]undecan-9(10)-ol, a concentration of about 35 percent by weight monomer in dioxane yields a product representing about an 87 percent conversion to polymer. However operation at a monomer concentration of about 50 weight percent in dioxane yields a product representing a conversion in excess of about 98 percent. Of course at very high monomer concentrations, the viscosity of the monomer and polymer solution can prevent process difficulties. Accordingly it is preferred in pursuit of high conversions to conduct the polymerization employing monomer concentrations in the range of from about 25 to about 70 percent by weight monomer.

Following completion of the polymerization recovery of the polymer and separation of polymer from catalyst may be accomplished by known techniques. For example, initially the polymerization product solution is polarized such as by addition of water, generally from about 5 to about 35 percent by weight based on the product solution. The water should be added in an amount sufficient to polarize the product solution, but not in such amounts as to cause precipitation of the polymer. The product solution is then neutralized with a suitable base, usually an excess is preferred, causing precipitation of of insoluble neutralization salts of the catalyst employed. For example, the product of a polymerization conducted with boron trifluoride as catalyst could be contacted with calcium hydroxide to produce insoluble calcium fluoride and calcium borate. Following separation of these salts from the polymerization product solution by titration or the like, the polymer may be recovered by preciptation from solution by addition of water or by evaporative methods. Since the acidic catalyst is often believed to form a complex with the polymer, as for example boron trifluoride, it is preferred to proceed through a neutralization step as discussed above, in order to obtain the polymer product in desirable purity.

Suspension polymerization techniques may also be employed to conduct the novel polymerization of this invention. In such a procedure the polymerization is conducted in the presence of a medium which is a solvent for the monomer the chain length modifier and the catalyst (again excepting ion exchange resins) but which does not dissolve the polymer. Thus the polymer upon formation will precipitate from solution, and may then be recovered. Suitable mediums for the suspension polymerization include chlorinated hydrocarbons such as 1,4-dichlorobutane, amylene dichloride, and the like, chlorinated ethers such as dichloroethyl ether, triglycol dichloride, dichloroisopropyl ether, and the like as well as other compounds such as bis(chloroethyl) carbonate. Hydrocarbons, such as aromatic hydrocarbons and the like are suitable, but give rise to process difficulty resulting from the relative insolubility of even short chain polymers in this type of medium. Thus precipitation of short chain polymers tends to complicate process considerations. However, all mediums which dissolve monomer and catalyst in which the polymer product is insoluble are operable.

Recovery of the polymer from the suspension polymerization product is also accomplished by known techniques. Initially the precipitate is washed with a non-polar liquid to remove the amount of the suspending medium accompanying the polymer precipitate. The polymer is then neutralized with an aqueous base solution to form the water soluble salts of the catalyst. Thus for example the product of a boron trifluoride catalyzed polymerization could be neutralized with sodium hydroxide solution to form soluble sodium fluoride and sodium borate salts. Again an excess of base is preferred to insure removal of all the catalyst from the polymer. Following the neutralization the polymer is recovered by filtration or the like.

In the conduct of the polymerization, the catalyst may be constantly added to a mixture of both monomer and chain modifier observing the desirability as pointed out above of continuing catalyst addition until substantial conversion of the monomer to polymer is achieved. Alternatively a mixture of monomer and catalyst may be continually added to a reaction with simultaneous continuous addition of catalyst. Thus it can be seen that the polymerization technique is not critical and may be accomplished in the most advantageous manner processwise.

It will be recognized that the production of the monomers useful in the polymers of this invention will involve simultaneous production as by products of related non-epoxy alcohols, acids, and the like. These non-epoxy compounds in the polymerization mixture can at times perform the function of chain length modifiers. Accordingly, particularly in the polymerization of monoepoxy alcohols and polyols wherein only a small comparative amount of chain length modifier is employed, the epoxy containing monomer should be employed in a fairly high degree of purity. Alternatively the possible effect of such by products as chain stoppers should be determined and allowed for, thus enabling control of the polymerization so as to produce a polymer of the desired chain length.

The preparation of the polycyclic epoxy monomers useful in the process of this invention may be accomplished by known methods. For example, the preparation of monoepoxy alcohols, monoepoxy oxyalkanols, monoepoxy oxyalkane polyols, as well as the monoepoxy diols of the compounds having the tricyclo$[5.2.1.0^{2,6}]$ decanoid ring or the tetracyclo-$[6.2.1.1^{3,6}.0^{2,7}]$dodecanoid ring is disclosed in French Patent No. 1,305,630. Monoepoxy hydroxyl-containing compounds having other polycarbocyclic ring structures as illustrated herein may be prepared by analogous procedures employing the polycarbocyclic diene corresponding to the desired ring structure in the place of dicyclopentadiene as employed in the preparative procedures in the above cited French patent.

The polycarbocyclic dienes corresponding to ring structures hereinbefore illustrated and set forth may be prepared by Diels-Alder addition. For example the tricyclo-$[6.2.1.0^{2,7}]$undeca-2,9-diene ring is obtained by Diels-Alder addition of bicycle$[2.2.1]$heptadiene and butadiene. Similarly tetracyclo$[6.5.1.0^{2,7}.0^{9,13}]$tetradeca - 3,11- decadiene can be synthesized by Diels-Alder addition of tricyclo$[5.2.1.0^{2,6}]$-deca-3,8-diene and butadiene. To further illustrate, hexacyclo$[6.6.1.1^{3,6}.1^{10,13}.0^{2,9}0^{9,14}]$heptadeca-4,11-diene may be produced by Diels-Alder addition of cyclopentadiene to tetracyclo-$[6.2.1.1^{3,6}0^{2,7}]$dodeca-4,9-diene. Monoepoxy diols may be conveniently prepared by hydrolyzing the above diepoxides with an equimolar amount of water under very slightly acidic conditions.

Diepoxides useful in the polyethers of the instant invention may be prepared by epoxidation of the corresponding dienic precursor with sufficient epoxidizing agent, to introduce the vicinal cyclic epoxy group at both unsaturated sites in the polycarbocyclic ring. Suitable epoxidizing agents, and conditions for diepoxidation are similar to those disclosed in French Patent 1,305,630 for epoxidizing the polycyclic alcohols to obtain the monoepoxy alcohols.

It is to be understood that the polycyclic epoxy monomers containing the oxymethyleneoxy radical, i.e., —$OCH_2O$—, are not encompassed within the scope of this invention. Accordingly, compounds having an oxymethanol group, an oxymethyleneoxyalkanol group, an oxymethyleneoxypolyol group or the like are not to be deemed included within the polycyclic hydroxy compounds useful in the composition of this invention.

In referring to the ring structures of the polycyclic hydroxy compounds of this invention the suffix "oid" has been used. This suffix indicates resemblance or likeness and is employed in instances wherein there is no attempt to characterize the polycyclic hydroxy compounds themselves but only to illustrate the type of ring structures they possess.

It is also pointed out that in the ensuing examples that the monomers employed were a mixture of position isomers. Accordingly the designation 5-oxatetracyclo $[6.2.1.0^{2,7}.0^{4,6}]$undecan-9(10)-ol, has been employed to designate that both the 9-substituted and 10-substituted isomers constituted the monomer feed.

The following examples are illustrative.

EXAMPLE I

To a 3-liter flask equipped with a stirrer and a condenser and containing 887 grams of dioxane at 30° C., was continuously added a solution of 1000 g. of 5-oxa-tetracyclo$[6.2.1.0^{2,7}.0^{4,6}]$undecan-9(10)-ol (6.024 moles) and 13.3 grams of water (.739 mole) in 1000 grams of dioxane over a period of about 3 hours. Simultaneously there was added 20 grams of BF₃-etherate catalyst in 170 grams of dioxane over a period of about 3.5 hours. Following the addition of catalyst, the solution was heated to 50° C. for about 4 hours. There was obtained following heating a viscous amber liquid solution. To this solution was added 111 grams of calcium hydroxide and 111 grams of water to separate the catalyst from polymer. The mixture was then heated for 2 hours at 50° C. and for 4 additional hours at 90° C. The solution was filtered to remove insoluble borate and fluoride salts formed by the calcium hydroxide addition and to remove the residual calcium hydroxide. The resulting solution contained 34.96 percent by weight of a polymerization product having a hydroxyl equivalent weight of 124.18 which corresponded to a polymer having 5.508 repeating units.

EXAMPLE II

To a four liter flask equipped with a stirrer and an addition flask was added 1000 grams of 5-oxatetracyclo-[6.2.1.0$^{2,7}$.0$^{4,6}$]undecan-9(10)-ol (6.02 moles), 1860 grams of dichloroethyl ether and 37 grams of butanol (0.5 mole) as a chain modifier. The amount of butanol was approximately that theoretically required to produce a polymer having 12 repeating units. The stirred mixture was cooled to 10° C. and maintained at a temperature of from 10° to 22° C. while 20 grams of boron trifluoride ethyl etherate catalyst dissolved in 170 grams of dichloroethyl ether was added slowly over a period of 90 minutes. During the addition a precipitate was formed appearing as a brown-purple slurry. The mixture was maintained at 25° C. for an additional 30 minutes following the catalyst addition and then was heated to 45° C. and maintained for 4 hours. The mixture was then cooled and the slurry was filtered and washed with dry acetone. The polymerization product appeared as a white precipitate and was air dried for two to six hours. The precipitate was then reslurried in 2000 grams of 1 percent sodium hydroxide solution and was heated to 65° C. for four hours. Following cooling and filtration the polymerization product was washed with water until neutral to moist litmus paper. After drying overnight there was obtained 903 grams of a white powdered polymerization product having a hydroxyl equivalent weight of 178. The polymeric product contained 98 weight percent based on the total weight of non-volatiles. A 50 weight percent solution of the polymerization product in dimethyl formamide demonstrated a viscosity of 376 centipoises at about 25° C. and a Gardner color value of 4.

EXAMPLE III

To a four liter flask equipped with a stirrer and an addition flask was added 1000 grams of 5-oxatetracyclo-[6.2.1.0$^{2,7}$.0$^{4,6}$]undecan-9(10)-ol (6.02 moles), 1887 grams of dichloroethyl ether and 12 grams of water (.66 mole) as a chain modifier. The amount of water was approximately that theoretically required to produce a polymer having 9.1 repeating units. The stirred mixture was cooled to 19° C. and maintained at a temperature of from 19 to 21° C. while 20 grams of boron trifluoride ethyl etherate catalyst dissolved in 170 grams of dichloroethyl ether was added slowly over a period of 90 minutes. During the addition a precipitate was formed appearing as a brown-purple slurry. The mixture was maintained at 25° C. for an additional 30 minutes following the catalyst addition and then was heated to 45° C. and maintained for 4 hours. The mixture was then cooled and the slurry was filtered and washed with dry acetone. The polymerization product appeared as a white precipitate and was air dried for two to six hours. The precipitate was then reslurried in 2000 grams of 1 percent sodium hydroxide solution and was heated to 65° C. for four hours. Following cooling and filtration the polymerization product was washed with water until neutral to moist litmus paper. After drying overnight there was obtained a white powdered polymerization product having a hydroxyl equivalent weight of 140 which corresponded to a polymer having 15 repeating units. The polymeric product contained 99 weight percent based on the total weight of non-volatiles. A 50 weight percent solution of the polymerization product in dimethyl formamide demonstrated a viscosity of 295 centipoises at about 25° C. and a Gardner color value of 2.

EXAMPLE IV

To a four liter flask equipped with a stirrer and an addition flask was added 1000 grams of 5-oxatetracyclo-[6.2.1.0$^{2,7}$.0$^{4,6}$]undecan-9(10)-ol (6.02 moles), 1886 grams of dichloroethyl ether and 13 grams of water (.72 mole) as a chain modifier. The amount of water was approximately that theoretically required to produce a polymer having 8.35 repeating units. The stirred mixture was cooled to 16° C. and maintained at a temperature of from 16 to 22° C. while 20 grams of boron trifluoride ethyl etherate catalyst dissolved in 170 grams of dichloroethyl ether was added slowly over a period of 90 minutes. During the addition a precipitate was formed appearing as a brown-purple slurry. The mixture was maintained at 25° C. for an additional 30 minutes following the catalyst addition and then was heated to 45° C. and maintained for 4 hours. The mixture was then cooled and the slurry was filtered and washed with dry acetone. The polymerization product appeared as a white precipitate and was air dried for two to six hours. The precipitate was then reslurried in 2000 grams of 1 percent sodium hydroxide solution and was heated to 65° C. for four hours. Following cooling and filtration the polymerization product was washed with water until neutral to moist litmus paper. After drying overnight there was obtained a white powdered polymerization product having a hydroxyl equivalent weight of 153 which corresponded to a polymer having 22 repeating units. The polymeric product contained 99.0 weight percent based on the total weight of nonvolatiles. A 50 weight percent solution of the polymerization product in dimethyl formamide demonstrated a viscosity of 348 centipoises at about 25° C. and a Gardner color value of 2.

EXAMPLE V

To a four liter flask equipped with a stirrer and an addition flask was added 200 grams of 5-oxatetracyclo-[6.2.1.0$^{2,7}$.0$^{4,6}$]undecan-9(10)-ol (1.205 moles) and 326 grams of dichloroethyl ether. The stirred mixture was cooled to 12° C. and maintained at a temperature of from 12 to 23° C. while 4 grams of boron trifluoride ethyl etherate catalyst dissolved in 41 grams of dichloroethyl ether was added slowly over a period of 90 minutes. During the addition a precipitate was formed appearing as a brown-purple slurry. The mixture was maintained at 25° C. for an additional 30 minutes following the catalyst addition and then was heated to 45° C. and maintained for 4 hours. The mixture was then cooled and the slurry was filtered and washed with dry acetone. The polymerization product appeared as a white precipitate and was air dried for two to six hours. The precipitate was then reslurried in 400 grams of 1 percent sodium hydroxide solution and was heated to 65° C. for four hours. Following cooling and filtration the polymerization product was washed with water until neutral to moist litmus paper. After drying overnight there was obtained 187 grams of a white powdered polymerization product having a hydroxyl equivalent weight of 163 which corresponded to a polymer having 102 repeating units. The polymeric product contained 98 weight percent based on the total weight of nonvolatiles. A 50 weight percent solution of the polymerization product in dimethyl formamide demonstrated a viscosity of 578 centipoises at about 25° C. and a Gardner color value of 4.

EXAMPLE VI

To a four liter flask equipped with a stirrer and an addition flask was added 1000 grams of 5-oxatetracyclo-

[6.2.1.0$^{2,7}$.0$^{4,6}$]undecan-9(10)-ol (6.02 moles), 1884 grams of dichloroethyl ether and 15.5 grams of ethylene glycol (0.25 mole) as a chain modifier. The amount of ethylene glycol was approximately that theoretically required to produce a polymer having 24 repeating units. The stirred mixture was cooled to 19° C. and maintained at a temperature of from 19 to 16° C. while 20 grams of boron trifluoride ethyl etherate catalyst dissolved in 170 grams of dichloroethyl ether was added slowly over a period of 90 minutes. During the addition a precipitate was formed appearing as a brown-purple slurry. The mixture was maintained at 25° C. for an additional 30 minutes following the catalyst addition and then was heated to 45° C. and maintained for 4 hours. The mixture was then cooled and the slurry was filtered and washed with dry acetone. The polymerization product appeared as a white precipitate and was air dried for two to six hours. The precipitate was then reslurried in 2000 grams of 1 percent sodium hydroxide solution and was heated to 65° C. for four hours. Following cooling and filtration the polymerization product was washed with water until neutral to moist litmus paper. After drying overnight there was obtained 955 grams of a white powdered polymerization product having a hydroxyl equivalent weight of 153 which corresponded to a polymer having 18 repeating units. The polymeric product contained 98 weight percent based on the total weight of nonvolatiles. A 50 weight percent solution of the polymerization product in dimethyl formamide demonstrated a viscosity of 340 centipoises at about 25° C. and a Gardner color value of 4.

EXAMPLE VII

To a four liter flask equipped with a stirrer and an addition flask was added 1000 grams of 5-oxatetracyclo-[6.2.1.0$^{2,7}$.0$^{4,6}$]undecan-9(10)-ol (6.02 moles), 1888 grams of dichloroethyl ether and 9 grams of water (0.5 mole) as a chain modifier. The amount of water was approximately that theoretically required to produce a polymer having 12 repeating units. The stirred mixture was cooled to 17° C. and maintained at a temperature of from 17 to 21° C. while 20 grams of boron trifluoride etherate catalyst dissolved in 170 grams of dichloroethyl ether was added slowly over a period of 90 minutes. During the addition a precipitate was formed appearing as a brown-purple slurry. The mixture was maintained at 25° C. for an additional 30 minutes following the catalyst addition and then was heated to 45° C. and maintained for 4 hours. The mixture was then cooled and the slurry filtered and washed with dry acetone. The polymerization product appears as a white precipitate and was air dried for two to six hours. The precipitate was then reslurried in 2000 grams of 1 percent sodium hydroxide solution and was heated to 65° C. for four hours. Following cooling and filtration the polymerization product was washed with water until neutral to moist litmus paper. After drying overnight there was obtained 952 grams of a white powdered polymerization product having a hydroxyl equivalent weight of 159 which corresponded to a polymer having 42 repeating units. The polymeric product contained 99.8 weight percent based on the total weight of non-volatiles. A 50 weight percent solution of the polymerization product in dimethyl formamide demonstrated a viscosity of 330 centipoises at about 25° C. and a Gardner color value of 2.

EXAMPLE VIII

To a 100 gallon glass lined autoclave equipped with a propeller-type agitator and a baffle was added 277 pounds of bis(2-chloroethyl)ether. The stirred liquid was heated to 30° C. and maintained at that temperature while adding simultaneously a solution of 225 pounds (1.355 lb. mole) of 5-oxatetracyclo[6.2.1.0$^{2,7}$.0$^{4,6}$]undecan-9(10)-ol, and 3.38 pounds (.188 lb. moles) of water in 225 pounds of dioxane and a solution of 4.5 pounds of BF$_3$-etherate catalyst dissolved in 31.5 pounds of dioxane over a period of six and a half hours. During the addition a precipitate was formed appearing as a brown-purple slurry. The mixture was maintained at 30° C. for an additional 30 minutes following the catalyst and monomer addition and then was heated to 50° C. and maintained for 4 hours. The mixture was then cooled and the slurry was filtered. The precipitate was reslurried in 450 pounds of a 1% aqueous solution of a nonyl phenyl polyethylene glycol having an average of 9 repeating ethyleneoxy units for two hours and filtered. The polymerization product obtained was rinsed with water until the filtrate was clear. The filtrate then was reslurried in 450 pounds of a 1 percent sodium hydroxide solution and was heated to 65° C. for four hours. Following cooling and filtration the polymerization product was washed with water until neutral to moist litmus paper. After drying overnight there was obtained 155 pounds of a white powdered polymerization product having a hydroxyl equivalent weight of 145.4 which corresponded to a polymer having 13.26 repeating units. The polymerization product contained 11.69 percent hydroxyl based on the total weight of nonvolatiles. A 50 weight percent solution of the polymerization product in dimethyl formamide demonstrated a viscosity of 240 centipoises at about 25° C. and a Gardner color value of 3.

EXAMPLE IX

To a 100 gallon glass-lined autoclave equipped with a stirrer and a condenser and containing 3.86 pounds of water (0.2144 pound mole) and 186.3 pounds of dioxane at 45° C. was continuously added a solution of 288 pounds of 5-oxatetracyclo[6.2.1.0$^{2,7}$.0$^{4,6}$]undecan-9(10)-ol (1.735 pound moles) in 144 pounds of dioxane over a period of about 4.3 hours. Simultaneously there was added 5.76 pounds of boron trifluoride etherate catalyst and 22.5 pounds of dioxane over a period of about 5.4 hours. The water present was 26.1 percent in excess of that theoretically required to produce a polymer having 10.20 repeating units. Following the addition of catalyst, the solution was heated to 50° C. for about 4 hours. There was obtained following heating, a viscous amber liquid solution which when tested was found to contain less than 1.0 percent unreacted 5-oxatetracyclo[6.2.1.0$^{2,7}$.0$^{4,6}$] undecan-9(10)-ol based upon the charge. To this solution was added 36 pounds of calcium hydroxide and 75 pounds of water to separate the catalyst from polymer. The mixture was then heated for 4 hours at 50° C. for 16 additional hours and at 90° C. The solution was filtered to remove insoluble borate and fluoride salts formed by the calcium hydroxide addition and to remove the residual calcium hydroxide. The resulting solution contained 42.52 percent by weight of a polymerization product having a hydroxyl equivalent weight of 140.26 which corresponded to a polymer having 10.20 repeating units. The solution demonstrated a Gardner color value of 4 and a Brookfield viscosity of 255 centipoises at about 25° C.

EXAMPLE X

To a 3-liter flask equipped with a stirrer and a condenser and containing 6.0 grams of water (.333 mole) and 250 grams of dioxane at 30° C., was continuously added a solution of 500 grams of 5-oxatetracyclo[6.2.1.0$^{2,7}$.0$^{4,6}$] undec-9(10)-ol (3.012 moles) in 311 grams of dioxane over a period of about 4 hours. Simultaneously there was added 10 grams of boron trifluoride ethyl etherate catalyst and 50 grams of dioxane over a period of about 5 hours. The water present was approximately that theoretically required to produce a polymer having 9.05 repeating units. Following the addition of catalyst, the solution was heated to 50° C. for about 4 hours. There was obtained following heating a viscous amber liquid solution which when tested was found to contain less than 1.0 percent unreacted 5-oxatetracyclo[6.2.1.0$^{2,7}$.0$^{4,6}$]undecan-9(10)-ol based upon the charge. To this solution was added 111 grams of calcium hydroxide and 166.5 grams of water to separate the catalyst from polymer. The mixture was then heated for 4 hours at 50° C. and for 8 additional hours at 90° C. The solution was filtered to remove insoluble borate and fluoride salts formed by the calcium hydroxide addition and to remove the residual calcium hydroxide. The resulting solution contained 41.31 percent by weight of a polymerization product having a hydroxyl equivalent weight of 138.66 which corresponded to a polymer having 9.49 repeating units. The solution demonstrated a Gardner color value of 1.

EXAMPLE XI

To a 35 gallon stainless steel autoclave equipped with a stirrer and a condenser and containing 0.90 pound of water (0.05 lb. mole) and 64.7 pounds of dioxane at 30° C. was continuously added a solution of 100 pounds of 5-oxatetracyclo[6.2.1.0$^{2,7}$.0$^{4,6}$]undecan-9(10)-ol (0.6024 lb. mole) in 50 pounds of dioxane over a period of about 2.9 hours. Simultaneously there was added 2 pounds of boron trifluoride ethyl etherate catalyst and 7.8 pounds of dioxane over a period of about 3.7 hours. The water present was approximately that theoretically required to produce a polymer having about 12 repeating units. Following the addition of catalyst, the solution was heated to 50° C. for about 4 hours. There was obtained following heating a viscous amber liquid solution which when tested was found to contain less than 1.0 percent unreacted 5-oxatetracyclo[6.2.1.0$^{2,7}$.0$^{4,6}$]undecan-9(10)-ol based upon the charge. To this solution was added 6.2 pounds of calcium hydroxide and 8.8 pounds of water to separate the catalyst from polymer. The mixture was then heated for 4 hours at 50° C. and for 16 additional hours at 90° C. The solution was filtered to remove insoluble borate and fluoride salts formed by the calcium hydroxide addition and to remove the residual calcium hydroxide. The resulting solution contained 44.66 percent by weight of a polymerization product having a hydroxyl equivalent weight of 151.65 which corresponded to a polymer having 19.88 repeating units. The solution demonstrated a Gardner color value of 2 and a Brookfield viscosity of 1450 centipoises at about 25° C.

EXAMPLE XII

To a 3-liter flask equipped with a stirrer and a condenser and containing 500 grams of dioxane at 30° C. was continuously added a solution of 1000 g. of 5-oxatetracyclo[6.2.1.0$^{2,7}$.0$^{4,6}$]undecan-9(10)-ol (6.024 moles) and 3.35 grams of water (.186 mole) in 400 grams of dioxane over a period of about 4 hours. Simultaneously there was added 20 grams of boron trifluoride ethyl etherate catalyst in 100 grams of dioxane over a period of about 5 hours. The water present was approximately that theoretically required to produce a polymer having 32.4 repeating units. Following the addition of catalyst, the solution was heated to 50° C. for about 4 hours. There was obtained following heating a viscous amber liquid solution which when tested was found to contain less than 1.65 percent unreacted 5-oxatetracyclo-[6.2.1.0$^{2,7}$.0$^{4,6}$]undecan-9(10)-ol based upon the charge. To this solution was added 222 grams of calcium hydroxide and 333 grams of water to separate the catalyst from polymer. The mixture was then heated for 4 hours at 50° C. and for 6 additional hours at 90° C. The solution was filtered to remove insoluble borate and fluoride salts formed by the calcium hydroxide addition and to remove the residual calcium hydroxide. The resulting solution contained 32.55 percent by weight of a polymerization product having a hydroxyl equivalent weight of 169.0 which corresponded to a polymer having an infinite number of repeating units. The solution demonstrated a Gardner color value of 4–5 and a Brookfield viscosity of 83 centipoises at about 25° C.

EXAMPLE XIII

To a 35 gallon stainless steel autoclave equipped with a stirrer and a condenser and containing 0.9 pound of water (.05 lb. mole) and 64.7 pounds of dioxane at 45° C., was continuously added a solution of 100 pounds of 5-oxatetracyclo[6.2.1.0$^{2,7}$.0$^{4,6}$]undecan-9(10)-ol (.602 lb. mole) in 50 pounds of dioxane over a period of about 2.9 hours. Simultaneously there was added 2 pounds of BF$_3$ etherate catalyst and 7.8 pounds of dioxane over a period of about 3.8 hours. The water present was approximately that theoretically required to produce a polymer having 12 repeating units. Following the addition of catalyst, the solution was heated to 50° C. for about 4 hours. There was obtained following heating a viscous amber liquid solution which when tested was found to contain less than 1.0 percent unreacted 5-oxatetracyclo[6.2.1.0$^{2,7}$.0$^{4,6}$]undecan-9(10)-ol based upon the charge. To this solution was added 12.5 pounds of calcium hydroxide and 26 pounds of water to separate the catalyst from polymer. The mixture was then heated for 4 hours at 50° C. and for 17 additional hours at 90° C. The solution was filtered to remove insoluble borate and fluoride salts formed by the calcium hydroxide addition and to remove the residual calcium hydroxide. The resulting solution contained 43.04 percent by weight of a polymerization product having a hydroxyl equivalent weight of 146.6 which corresponded to a polymer having 14.18 repeating units. The solution demonstrated a Gardner color value of 5 and a Brookfield viscosity of 420 centipoises at about 25° C.

The novel polymerization may also be effected employing other monomers within the scope of this invention, or employing combinations of monomers. The following procedures are exemplary.

EXAMPLE XIV

Employing the solution polymerization procedure similar to that employed in Example I, when a mixture of 500 grams of 5-oxatetracyclo[6.2.1.0$^{2,7}$.0$^{4,6}$]undecan-9(10)-ol (3.012 moles) and 543 grams of 5-oxatetracyclo[7.2.1.0$^{2,8}$.0$^{4,6}$]dodecan-10(11)-ol is substituted for the 5-oxatetracyclo[6.2.1.0$^{2,7}$.0$^{4,6}$]undecan-9(10)-ol employed, a copolymer of 5-oxatetracyclo[6.2.1.0$^{2,7}$.0$^{4,6}$]undecan-9(10)-ol and 5-oxatetracyclo[7.2.1.0$^{2,8}$.0$^{4,6}$]dodecan-10(11)-ol having an average of about 5 repeating units is obtained.

EXAMPLE XV

Employing the solution polymerization procedures similar to that employed in Example X when 548 grams of 5-oxatetracyclo[6.2.1.0$^{2,7}$.0$^{4,6}$]undecane-9,10-diol (3.012 moles) is substituted for the 5-oxatetracyclo[6.2.1.0$^{2,7}$.0$^{4,6}$]undecan-9(10)-ol therein employed a polymer of 5-oxatetracyclo[6.2.1.0$^{2,7}$.0$^{4,6}$]undecane-9,10-diol having an average of about 9 repeating units is obtained. The polymer of 5-oxatetracyclo[6.2.1.0$^{2,7}$.0$^{4,6}$]undecane-9,10-diol is characterized by a lower hydroxyl equivalent weight since each repeating unit of the polymer contains an average of about two repeating units.

EXAMPLE XVI

Employing the suspension polymerization procedure similar to that employed in Example III, when 1086 grams of 5-oxatetracyclo[7.2.1.0$^{2,8}$.0$^{4,6}$]dodecan-10(11)-ol (6.02 moles) is substituted for the 5-oxatetracyclo-[6.2.1.0$^{2,7}$.0$^{4,6}$]undecan-9(10)-ol, a polymer of 5-oxatetracyclo[7.2.1.0$^{2,8}$.0$^{4,6}$]dodecan-10(11)-ol having an average of about 15 repeating units is produced.

EXAMPLE XVII

Employing the suspension polymerization procedure similar to that employed in Example III when 1086 grams of 5-oxatetracyclo[6.2.1.0$^{2,7}$.0$^{4,6}$]undec-9(10)-yl methanol (6.02 moles) is substituted for 5-oxatetracyclo-[6.2.1.0$^{2,7}$.0$^{4,6}$]undec-9(10)-ol, a polymer of 5-oxatetracyclo[6.2.1.0$^{2,7}$.0$^{4,6}$]undec-9(10)-yl methanol having an average of about 15 repeating units.

EXAMPLE XVIII

Employing the suspension polymerization procedure similar to that employed in Example III when 1155 grams of 10-oxapentacyclo[6.3.1.1$^{3,6}$.0$^{2,7}$.0$^{9,11}$]tridecan-4(5)-ol (6.02 moles) is substituted for 5-oxatetracyclo-[6.2.1.0$^{2,7}$.0$^{4,6}$]undecan-9(10)-ol there is obtained a polymer of 10-oxapentacyclo[6.3.1.1$^{3,6}$.0$^{2,7}$.0$^{9,11}$]tridecan-4(5)-ol having an average of about 15 repeating units.

EXAMPLE XIX

Employing the suspension polymerization procedure similar to that employed in Example III when 1265 grams of 5-oxatetracyclo[6.2.1.0$^{2,7}$.0$^{4,6}$]undec-9(10)-oxyethanol (6.02 moles) is substituted for the 5-oxatetracyclo[6.2.1.0$^{2,7}$.0$^{4,6}$]undecan-9(10)-ol there is obtained a polymer of 5-oxatetracyclo[6.2.1.0$^{2,7}$.0$^{4,6}$]undec-9(10)-oxyethanol having an average of about 15 repeating units.

EXAMPLE XX

Employing a suspension polymerization procedure similar to that employed in Example III when 1250 grams of 10-oxapentacyclo[6.3.1.1$^{3,6}$.0$^{2,7}$.0$^{9,11}$]tridecane-4,5-diol (6.02 moles) is substituted for 5-oxatetracyclo [6.2.1.0$^{2,7}$.0$^{4,6}$]undecan-9(10)-ol, there is obtained a polymer of 10-oxapentacyclo[6.3.1.1$^{3,6}$.0$^{2,7}$.0$^{9,11}$]tridecane-4,5-diol having an average of about 15 repeating units. Since the polymer of 10-oxapentacyclo [6.3.1.1$^{3,6}$.0$^{2,7}$.0$^{9,11}$]tridecane-4,5-diol contains an average of about 2 hydroxyl groups per repeating unit the hydroxyl equivalent weight of such a polymer having an average of 15 repeating units would be about 95.

Hydroxyl equivalent weight as employed in the foregoing examples is defined as the molecular weight of the average polymeric unit divided by the average number of hydroxyl groups per unit. Hydroxyl equivalent weight may be ascertained by reacting the hydroxyl groups in the polymer with an anhydride, e.g., phthalic anhydride, to form the phthalic half ester of the polymeric polycyclic polyol. The mixture may then be back titrated with a base such as potassium hydroxide to determine the amount of anhydride consumed. Accordingly, the equivalents of hydroxyl per gram of the polymeric polycyclic polyol may be calculated, the reciprocal of which is hydroxyl equivalent weight.

What is claimed is:

1. A process for producing liquid to fusible polycyclic polyether polyols having an average of at least about one hydroxyl group per repeating unit and having an average chain length of $n+1$ repeating units which comprises contacting (a) a polycarbocyclic compound identified by a fused polycarbocyclic ring structure having up to 6 carbocycles, each carbocycle containing from 5 to 6 carbon atoms therein, said polycarbocyclic ring structure having at least one and no more than two integral bicyclo[2.2.1]heptanoid rings, said polycarbocyclic compound being composed of carbon, hydrogen and oxygen atoms and containing no reactive groups other than at least one cyclic vicinal epoxy group whose vicinal carbon atoms form part of the polycarbocyclic ring structure, and at least one additional hydroxyl equivalent in the form of radicals of the group consisting of hydroxyl groups and said cyclic vicinal epoxy groups, and (b) a hydroxyl containing non-epoxy chain length modifier selected from the group consisting of water and organic compounds free from substituents other than alcoholic hydroxyl groups which react with epoxy groups, in the presence of a catalytically effective amount of an acid epoxy polymerization catalyst, the said polycarbocyclic compound and the said chain length modifier being present in such amount as to provide $n+1$ moles of polycarbocyclic compound to at least $(E-1)n+E$ moles of chain length modifier wherein E represents the number of cyclic vicinal epoxy groups in said polycarbocyclic compound, and $n+1$ represents the number of repeating units desired in said polycyclic polyether polyols.

2. A process for producing liquid to fusible polycyclic polyether polyols having an average of at least about one hydroxyl group per repeating unit and having an average chain length of $n+1$ repeating units which comprises contacting (a) a monoepoxy polycarbocyclic compound identified by a polycarbocyclic ring structure selected from the group consisting of the bicyclo[2.2.1]heptanoid ring and fused homocarbocyclic ring structures of which at least one integral bicyclo[2.2.1]heptanoid structure is a part, said polycarbocyclic compound being characterized by no more than 4 carbocycles each of which contains 5 to 6 carbon atoms therein and one cyclic vicinal epoxy group whose vicinal carbon atoms form part of the polycarbocyclic ring structure, and at least one hydroxyl group, said hydroxyl groups selected from the group consisting of hydroxyl groups bonded directly to the polycarbocyclic ring structure and hydroxyl groups bonded to said polycarbocyclic structure through alkylene of 1 to 6 carbon atoms, alkyleneoxy of 1 to 6 carbon atoms, and polyalkyleneoxy which has up to 5 repeating alkyleneoxy units therein and from 1 to 6 carbon atoms in each of said units, said polycarbocyclic compound being composed of carbon, hydrogen and oxygen atoms and containing no reactive groups other than hydroxyl and epoxy groups, and (b) a hydroxyl containing non-epoxy chain length modifier selected from the group consisting of water and organic compounds free from substituents other than alcoholic hydroxyl substituents which react with epoxy groups, in the presence of a catalytically effective amount of an acid epoxy polymerization catalyst selected from the group consisting of inorganic acids and metal halide Lewis acids, said polycarbocyclic compound and said chain length modifier being present in such amount as to provide $n+1$ moles of polycarbocyclic compound to at least 1 mole of chain length modifier, wherein $n+1$ represents the desired length of said polycyclic polyether polyols, the amount of said chain length modifier not to exceed the aforesaid ratio by more than about 1 percent by weight based upon the total weight of said polycarbocyclic compound and said chain length modifier.

3. The process of claim 2 wherein said polycarbocyclic compound contains at least one hydroxyl group bonded directly to said polycarbocyclic structure.

4. The process of claim 3 wherein the said chain length modifier is water.

5. The process of claim 3 wherein the said epoxy polymerization catalyst is selected from the group consisting of boron trifluoride and boron trifluoride etherate complexes said etherate portion being free of substituents which react with epoxy groups.

6. A process for producing liquid to fusible polycyclic polyether polyols containing an average of at least about one hydroxyl group per repeating unit and having an average of $n+1$ repeating units which comprises contacting (a) a polycarbocyclic compound identified by a fused polycarbocyclic ring structure containing 3 to 4 carbocycles and said fused polycarbocyclic structure containing an integral bicyclo[2.2.1]heptanoid ring, said polycarbocyclic compound having at least one cyclic vicinal epoxy group whose vicinal carbon atoms form part of the polycarbocyclic ring and at least one hydroxyl group, said hydroxyl groups being bonded directly to the polycarbocyclic ring structure, said polycarbocyclic compound being composed of carbon, hydrogen and oxygen atoms and containing no reactive groups other than hydroxyl and epoxy groups, and (b) water, in the presence of a catalytically effective amount of an acidic epoxy polymerization catalyst selected from the group consisting of inorganic acids and metal halide Lewis acids, at a temperature of from about 10 to about 100° C., said polycarbocyclic compound and water being present in a molar ratio of $n+1$ moles of polycarbocyclic compound to at least 1 mole of water, the amount of water not to exceed the aforesaid ratio by more than about 1 percent by weight based on the total weight of said polycarbocyclic compound and the water, the catalyst to be added in such a manner as to provide presence of free catalyst in the polymerization mixture until at least 75 percent by weight of the said polycarbocyclic compound has been reacted.

7. The process of claim 6 wherein the catalyst is selected from the group consisting of boron trifluoride and boron trifluoride etherate complexes the etherate portion of which is free of substituents which react with epoxy groups.

8. The process of claim 6 wherein the catalyst is boron trifluoride.

9. The process of claim 6 wherein the catalyst is phosphoric acid.

10. The process of claim 7 wherein the polycarbocyclic compound is 5-oxatetracyclo[6.2.1.0$^{2,7}$.0$^{4,6}$]undecan-9(10)-ol.

11. The process of claim 7 wherein the polycarbocyclic compound is 5-oxatetracyclo[6.2.1.0$^{2,7}$.0$^{4,6}$]undecane-9,10-diol.

12. The process of claim 7 wherein the polycarbocyclic compound is 5-oxatetracyclo[7.2.1.0$^{2,8}$.0$^{4,6}$]dodecan-10(11)-ol.

13. The process of claim 6 wherein the polycarbocyclic compound is 10-oxapentacyclo[6.3.1.1$^{3,6}$.0$^{2,7}$.0$^{9,11}$]tridecan-4(5)-ol.

14. A process for producing liquid to fusible polycyclic polyether polyols containing an average of at least about one hydroxyl group per repeating unit and having an average of $n+1$ repeating units which comprises contacting (a) a polycarbocyclic compound identified by a fused polycarbocyclic ring structure containing from 3 to 4 carbocycles and said fused polycarbocyclic structure containing an integral bicyclo[2.2.1]heptanoid ring, said polycarbocyclic compound having at least one cyclic vicinal epoxy group whose vicinal carbon atoms form part of the polycarbocyclic ring and at least one hydroxyl group, said hydroxyl groups being bonded directly to the polycarbocyclic ring structure, said polycarbocyclic compound being composed of carbon, hydrogen and oxygen atoms and containing no reactive groups other than hydroxyl and epoxy groups, and (b) as a chain length modifier an organic alkanol which is free from phenolic hydroxyl groups, in the presence of a catalytically effective amount of an acidic epoxy polymerization catalyst selected from the group consisting of inorganic acids and metal halide Lewis acids, at a temperature of from about 10 to about 100° C., said polycarbocyclic compound and said chain length modifier being present in a molar ratio of $n+1$ moles of polycarbocyclic compound to at least 1 mole of chain length modifier, the amount of said chain length modifier not to exceed the aforesaid ratio by more than 1 percent by weight based upon the total weight of said polycarbocyclic compound and said chain length modifier, the catalyst to be added in such a manner as to provide presence of free catalyst in the polymerization mixture until at least 75 percent by weight of the said polycarbocyclic compound has been reacted.

15. The process of claim 14 wherein the said catalyst is boron trifluoride.

16. The process of claim 14 wherein the said catalyst is a boron trifluoride etherate complex wherein said etherate portion is free of substituents which react with epoxy groups.

17. The process of claim 14 wherein the chain modifier is methanol.

18. The process of claim 14 wherein the chain length modifier is ethylene glycol.

19. The process of claim 14 wherein said polycarbocyclic compound is 5-oxatetracyclo[6.2.1.0$^{2,7}$.0$^{4,6}$]undecan-9(10)-ol.

20. The process of claim 14 wherein said polycarbocyclic compound is 5-oxatetracyclo[6.2.1.0$^{2,7}$.0$^{4,6}$]undecane-9,10-diol.

21. The process of claim 14 wherein said polycarbocyclic compound is 5-oxatetracyclo[7.2.1.0$^{2,8}$.0$^{4,6}$]dodecan-10(11)-ol.

22. A process for producing liquid to fusible polycyclic polyether polyols having an average of at least about 1 hydroxyl group per repeating unit and containing $n+1$ repeating units which comprises contacting (a) 5-oxatetracyclo[6.2.1.0$^{4,6}$.0$^{2,7}$]undecan-9(10)-ol and (b) water in a molar ratio of $n+1$ to at least 1, the amount of water not to exceed the said ratio by more than 1 weight percent based upon the weight of (a) and (b), in the presence of a catalytically effective amount of boron trifluoride at a temperature of from about 10 to 100° C.

23. The process of claim 22 wherein the process is conducted in an organic solvent medium in which the 5-oxatetracyclo[6.2.1.0$^{2,7}$.0$^{4,6}$]undecanol, the water, and the polycyclic polyether polyol produced are soluble.

24. The process of claim 23 wherein the dissolving medium is dioxane.

25. The process of claim 23 wherein the process is conducted in an organic solvent medium in which the 5-oxatetracyclo[6.2.1.0$^{2,7}$.0$^{4,6}$]undecan-9(10)-ol and the water are soluble but in which the polycyclic polyether polyol produced is not soluble.

26. The process of claim 25 wherein said medium is a chlorinated hydrocarbon.

27. The process of claim 25 wherein said medium is dichloroethyl ether.

References Cited

UNITED STATES PATENTS 3,187,018   6/1965   Tinsley et al.
3,305,565   2/1967   Mueller.

FOREIGN PATENTS 932,144   7/1963   Great Britain.

WILLIAM H. SHORT, *Primary Examiner.*

T. E. PERTILLA, *Assistant Examiner.*

U.S. Cl. X.R.

260—33.8, 611